Patented June 5, 1945

2,377,744

UNITED STATES PATENT OFFICE 2,377,744

PROCESS AND CATALYST FOR THE CONVERSION OF HYDROCARBONS

William A. Bailey, Jr., Oakland, Calif., assignor to Shell Development Company, San Francisco, Calif., a corporation of Delaware No Drawing. Application June 8, 1943,
Serial No. 490,090

8 Claims. (Cl. 196—52)

This invention relates to the conversion of hydrocarbons with catalysts and to new and improved catalysts which are particularly suited for the conversion of hydrocarbons at elevated temperatures.

A particular aspect of the invention relates to the catalytic cracking of vaporizable hydrocarbon oils to produce substantial yields of lower boiling normally liquid and/or gaseous products. Other conversions contemplated include the operation in catalytic cracking known as "repassing," the isomerization of olefins, the reforming of gasolines and naphthas, the viscosity breaking of heavy oils, the dehydrogenation of naphthenic hydrocarbons, the isoforming of cracked gasolines and naphthas, gas reversion, and similar and related operations including the breaking of carbon-carbon bonds and splitting and/or rearrangement of the carbon skeleton. These various conversions generally are applied for converting hydrocarbon oils into gasoline-type motor fuels of high anti-knock properties. They may also be employed, however, for the treatment or conversion of single hydrocarbons and relatively simple mixtures of hydrocarbons. They are generally effected at temperatures at least as high as those of incipient cracking, and in most cases at least a minor amount of cracking occurs.

It has long been known that the cracking of hydrocarbons and various related reactions are catalyzed to a certain extent by certain natural earths and clays. These natural materials are generally not uniform, relatively inefficient, relatively non-selective in their action and are therefore generally unsatisfactory for commercial use. In order to provide catalysts of improved properties, various catalysts prepared by modifying these natural earths and clays were developed. These catalysts were later replaced by new and improved catalysts prepared synthetically. These synthetic clay-type catalysts comprise silica and/or alumina and often contain minor amounts of such materials as zirconia, magnesia, magnesium fluoride, etc. They are prepared by a variety of specially developed, very critical and involved processes and are variously termed "blends of silica and alumina," "silica-alumina composites," "hydrated aluminum silicates," etc. These catalysts are by far the best catalysts known to the art for catalytic cracking and certain related processes, and are in large scale commercial use.

In spite of the marked advantages of the presently employed silica-alumina catalysts, the use of these catalysts in catalytic cracking and related processes has certain important defects. One of these defects is that these catalysts are easily spoiled by slight overheating. In all of these processes it is necessary to periodically burn carbonaceous deposits from the catalyst. It is therefore necessary to effect this burning or regeneration step at a closely controlled slow rate with accurate temperature control and elaborate means for removing the heat of combustion. Another defect is that most of these processes involve contacting the catalyst with steam at temperatures in the incipient cracking or cracking range, and none of these catalysts are able to retain their activity under these conditions for more than a very short time. See, for example, U. S. Patent 2,215,305. Another defect is that these synthetic catalysts are extremely sensitive to variations in surface characteristics, bulk density, etc. and involve complicated time-consuming and exacting methods of preparation; consequently, a single charge of catalyst for a commercial plant involves an investment of several tens of thousands of dollars.

One of the characteristics of all of the synthetic catalysts of this type is that they are substantially free of all but the most minute traces of alkali metal salts. It has been known for some time that even traces of sodium salts or other alkali metal salts in these catalysts cause the catalysts to lose activity rapidly on use and are extremely detrimental. Even traces of sodium salts often present in steam are sufficient to severely damage these catalysts. In order to avoid the presence of sodium salts in the catalysts, it is the practice to thoroughly wash them with distilled water in the commercial preparation. In fact, the removal of traces of sodium salts is the most time-consuming, difficult and costly operation involved in the catalyst preparation and is largely responsible for the high cost of the catalysts.

There has now been discovered and developed new and improved hydrocarbon conversion catalysts in which the presence of certain amounts of alkali metal is not detrimental but very beneficial. These catalysts possess excellent activity for the several types of conversions for which the hitherto-used clays and synthetic clay-type catalysts are active. They are, however, superior to the hitherto-proposed and used natural and synthetic catalysts of this type in several important respects. One important advantage of the catalysts of the invention is that they may be more cheaply and uniformly produced from available materials and require a minimum of equipment for their preparation. In their practical application, therefore, the catalyst replacement costs are considerably reduced. Another important advantage of the present catalysts is that in the treatment of carbonaceous material under conditions of cracking or incipient cracking they give exceptionally low yields of carbon and give gaseous fractions which are exceptionally rich in valuable olefins. This allows various conversions to be executed with greater overall yields of valuable products and decreased regeneration costs. Another important advantage of the catalyst of the invention is that they withstand higher temperatures. This allows more efficient high temperature regeneration. Still another very important advantage of the present catalysts is that they may be employed with steam at high temperatures without the severe loss in activity noted in the catalysts now commercial used. Still another important advantage is that after the catalysts have been used for a long period of time and have become spent they usually may be easily and cheaply remade.

The catalysts of the invention consist essentially of a major amount of a synthetic alumina gel, a minor effective amount of boric oxide and certain small but definite concentrations of alkali metal. Catalysts consisting of boric oxide and alumina gel have been proposed for catalytic cracking and for he isomerization of olefins. These catalysts, however, like the above-described silica-alumina blends, are free of all but the most minute traces of alkali metal salts. It is now found that these catalysts are much improved if certain small but definite concentrations of alkali metal are present.

The alumina gel may be prepared by any one of several known methods. The most common suitable method is to precipitate an alumina gel from a solution of a soluble aluminum salt such as aluminum sulfate, aluminum nitrate, aluminum chloride or the like with a base such, for example, as ammonium hydroxide.

The alumina gels prepared as described generally have extremely large available surfaces, for instance in the order of 200–400 square meters per gram. If boric oxide is incorporated into these gels, however, the resulting catalysts, although fairly active, cause the formation of excessive amounts of carbon and are inferior.

The alkali metal present in the catalysts of the invention is preferably intimately combined with the alumina gel prior to the incorporation of the boric oxide. In general, the alkali metal is sodium and/or potassium. Other alkali metals may, however, be substituted. The form or condition of the alkali metal in the catalyst is not known. It is believed, however, that the alkali metal probably exists in the finished catalyst in the form of an oxide. Thus, the preferred alkali metal compounds to be applied are those which are convertible to the oxide by heating. Preferred compounds are, for example, the hydroxides, nitrates, sulfates, acetates, etc.

The concentration of alkali metal in the catalysts of the invention is between about 0.1% and 1% of the alumina gel. Concentrations below about 0.1% are ineffective and excessive amounts are to be avoided since they severely depress the catalytic activity.

The specified concentrations of alkali metal in the alumina gel may be provided either by adding an equivalent amount of a suitable alkali metal compound to the alumina gel or by removing alkali metal salts from a gel containing excessive amounts. Thus, for example, in the usual methods for preparing alumina gels, the gel is precipitated from a solution of an aluminum salt by means of ammonium hydroxide. The gels so formed generally contain no significant amounts of alkali metal salts. The alkali metal may be incorporated itno alumina gels of this type by simply homogenizing a suitable alkali metal compound or solution thereof with the wet hydrous gel, by effecting the precipitation in the presence of suitable concentrations of alkali metal salts, by effecting the precipitation with a suitable mixture of ammonium hydroxide and alkali metal hydroxide, by impregnating the hydrous gel with a solution of the alkali metal salt, or by impregnating the dried gel with a solution of the alkali metal salt. Although it is not the common practice, the alumina gel may be precipitated from a solution of an aluminum salt by means of an alkali metal hydroxide. The gels so formed generally contain excessive amounts of alkali metal salts. In such cases it is necessary to leach out the excess alkali metal salt. This may be done with the wet hydrous gel, or the dried gel.

The alumina gel, prior to incorporating the alkali metal and/or the boric oxide, may advantageously be peptized, for instance, by treating the precipitated and washed gel with a dilute solution of acetic acid.

The boric acid is preferably incorporated into the alumina after the concentration of alkali metal has been adjusted. This may be done, for example, by homogenizing the unpeptized or petized wet hydrous alumina gel with boric acid, or by impregnating the hydrous gel or dried gel with boric acid. The composite is then calcined at a temperature between about 600° F. and 1100° F. to convert the boric acid to boric oxide. Other compounds of boron decomposable to boric oxide by heat may also be employed in place of boric acid. Boric oxide per se may conveniently be applied in solution in an alcoholic solvent. Since the concentrations of alkali metal in the catalyst must be within the above-specified limits, alkali metal borates obviously cannot be employed.

The concentration of boric oxide in the catalysts of the invention is above about 8% and preferably at least 10%. Lower concentrations of boric oxide give very inferior catalysts. Excessive concentrations of boric oxide are also somewhat detrimental. In general, concentrations between about 12% and 25% are optimum.

The catalysts may be prepared in any form suitable for the particular use contemplated. Thus, they may be prepared in a finely powdered form for use in dust catalyst and/or fluidized catalyst systems, in spherical marbles suitable for use in moving bed systems, or in the form of pellets or fragments suitable for use in fixed bed systems.

According to the process of the invention, the catalytic conversion of higher boiling hydrocarbon oils to lower boiling hydrocarbons and the above-mentioned related processes are carried out more effectively and advantageously with the above-described catalysts. These various conversions are carried out by contacting the hydrocarbon or other carbonaceous material to be reacted with the catalysts of the invention under conditions of temperature, pressure, space velocity, etc. known to be suitable for the desired reaction or conversions. Thus, for example, in the catalytic cracking of hydrocarbon oils, the oil, usually in the form of preheated vapors, is contacted with the catalyst at a temperature between about 750° F. and 1100° F., under a pressure usually between about 1 and 5 atmospheres absolute. The contact time is adjusted to give the desired degree of cracking and usually is between about 0.5 and 30 seconds. In the liquid phase cracking operation, commonly referred to as viscosity breaking somewhat longer contact times may, however, be preferred. The exceptionally short contact times in the order of 0.5 to 3 seconds (most easily obtained in dust catalyst systems of operation) are made possible by the exceptionally high activity of the catalysts. The products obtained using such short contact times are generally of exceptionally high quality. In view of this exceptionally high initial activity and other characteristics of the catalysts of the invention, they are particularly advantageous for effecting these various conversions in dust catalyst systems and fluidized catalyst systems wherein the catalyst in a finely divided state is continuously recycled through a suitable reaction zone and a regeneration zone. They may, however, also be advantageously employed in other conventional systems including moving bed systems and fixed bed systems.

I claim as my invention:

1. The process of converting hydrocarbon oils into gasoline motor fuels with anti-knock properties which comprises subjecting said oils at conversion temperature to the action of a solid hydrocarbon conversion catalyst consisting essentially of a major amount of a synthetic alumina gel containing between about 0.1% and 1% of an alkali metal and a minor amount above about 8% of boric oxide.

2. The process of converting hydrocarbon oils into gasoline motor fuels with anti-knock properties which comprises subjecting said oils at conversion temperature to the action of a solid hydrocarbon conversion catalyst consisting essentially of a major amount of a synthetic alumina gel containing between about 0.1% and 1% of an alkali metal and between about 12% and 25% of boric oxide.

3. The process of catalytically cracking hydrocarbon oils which comprises contacting said hydrocarbon oils at a temperature between about 750° F. and 1100° F. at a pressure between about 1 and 5 atmospheres for contact time between about 0.5 and 30 seconds with a solid synthetic composite gel catalyst consisting essentially of a major amount of a synthetic alumina gel containing between about 0.1% and 1% of an alkali metal and a minor amount above about 8% of boric oxide.

4. The process of catalytically cracking hydrocarbon oils which comprises contacting said hydrocarbon oils at a temperature between about 750° F. and 1100° F. at a pressure between about 1 and 5 atmospheres for contact time between about 0.5 and 30 seconds with a solid synthetic composite gel catalyst consisting essentially of a major amount of a synthetic alumina gel containing between about 0.1% and 1% of an alkali metal and between about 12% and 25% of boric oxide.

5. A synthetic gel catalyst possessing activity for the cracking of hydrocarbon oils consisting essentially of a major amount of a synthetic alumina gel containing between about 0.1% and 1% of an alkali metal and a minor amount above about 8% of boric oxide.

6. A synthetic gel catalyst possessing activity for the cracking of hydrocarbon oils consisting essentially of a major amount of a synthetic alumina gel containing between about 0.1% and 1% of an alkali metal and between about 12% and 25% of boric oxide.

7. A method for the preparation of a synthetic gel catalyst possessing activity for the cracking of hydrocarbon oils which comprises forming a hydrous alumina gel, incorporating into said gel a compound of an alkali metal decomposable to the oxide by heat in an amount equivalent to between 0.1% and 1% of alkali metal based on the dry alumina gel, incorporating boric acid into said gel in an amount sufficient to give between about 12% and 25% boric oxide in the finished catalyst, and heating the composite at a temperature between about 600° F. and 1100° F. to convert the boric acid to boric oxide.

8. A method for the preparation of a synthetic gel catalyst possessing activity for the cracking of hydrocarbon oils which comprises forming a peptized hydrous alumina gel, incorporating into said peptized gel a compound of an alkali metal decomposable to the oxide by heat in an amount equivalent to between 0.1% and 1% of alkali metal based on the dry alumina gel, incorporating boric acid into said gel in an amount sufficient to give between about 12% and 25% boric oxide in the finished catalyst, and heating the composite at a temperature between about 600° F. and 1100° F. to convert the boric acid to boric oxide.

WILLIAM A. BAILEY, JR.